United States Patent [19]

Hagner et al.

[11] 4,233,650
[45] Nov. 11, 1980

[54] BRIGHTNESS CONTROL FOR FIBER OPTICAL LAMPS

[75] Inventors: Willi Hagner, Solms; Horst Frimmel, Hermannstein, both of Fed. Rep. of Germany

[73] Assignee: Ernst Leitz Wetzlar GmbH, Fed. Rep. of Germany

[21] Appl. No.: 947,093

[22] Filed: Sep. 29, 1978

[30] Foreign Application Priority Data

Oct. 8, 1977 [DE] Fed. Rep. of Germany ....... 2745397

[51] Int. Cl.³ .................... F21V 7/04; G02B 9/00; F21V 17/02
[52] U.S. Cl. .................... 362/32; 350/206; 362/283; 362/322
[58] Field of Search ............ 362/17, 18, 32, 35, 362/282, 283, 322, 323; 350/96.18, 96.19, 206, 207, 208

[56] References Cited

U.S. PATENT DOCUMENTS

| 3,483,807 | 12/1969 | Biedermann | 350/206 |
| 3,775,606 | 11/1973 | Bazell | 362/32 |

FOREIGN PATENT DOCUMENTS

663722 12/1951 United Kingdom .

Primary Examiner—Donald P. Walsh
Attorney, Agent, or Firm—Schwartz, Jeffery, Schwabb, Mack, Blumenthal & Koch

[57] ABSTRACT

Disclosed is a brightness control device for use with fiber optical lamps, comprising a diaphragm which is arranged unilaterally in the light beam between the lamp light source and the light entrance area of the fiber optical conductor. The diaphragm comprises a variable size diaphragm which is designed such that the cross-section of the light entrance area of the fiber optical conductor is asymmetrically and unilaterally reduced in order to maintain a constant lamp color temperature and emission characteristic.

5 Claims, 4 Drawing Figures

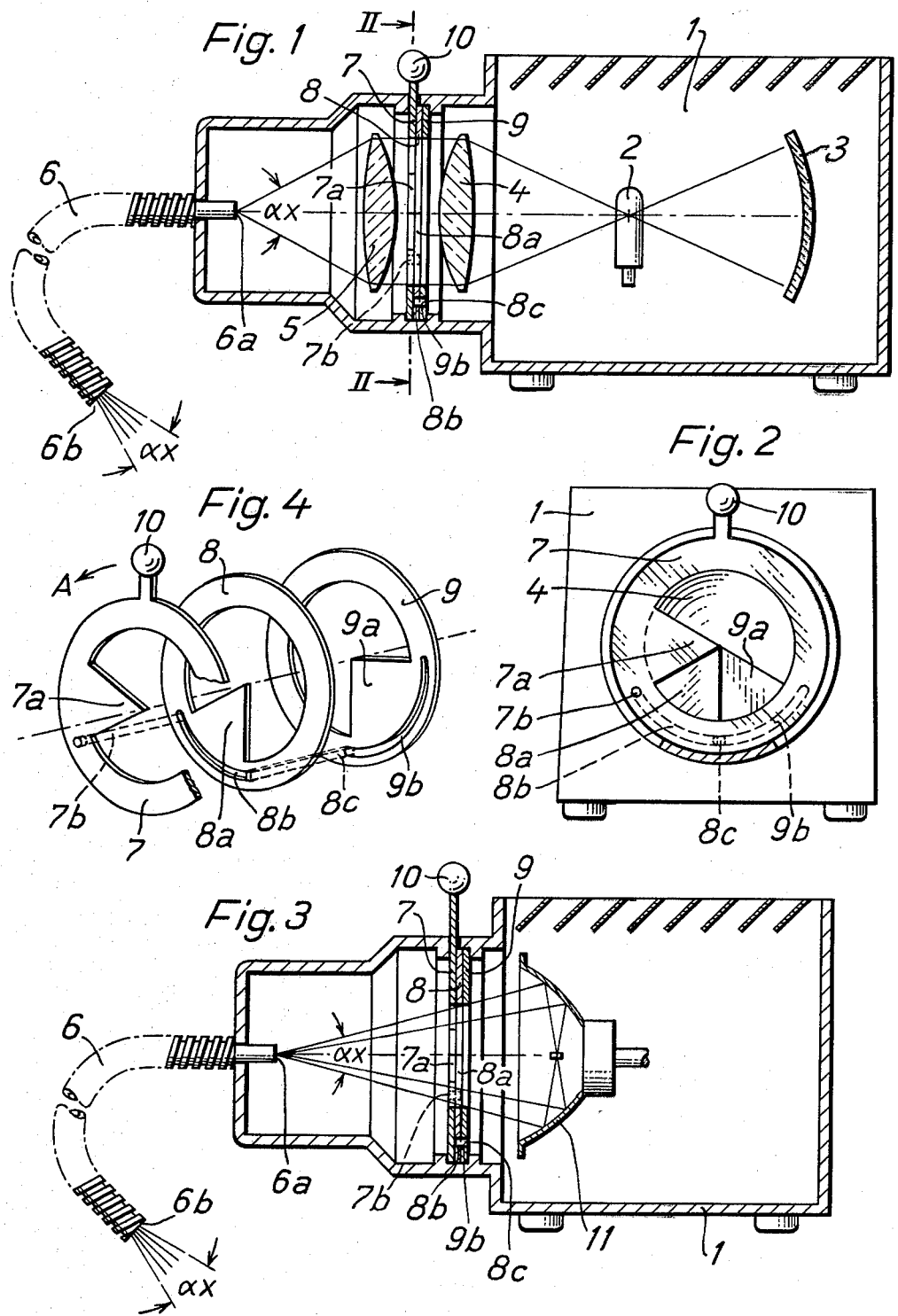

BRIGHTNESS CONTROL FOR FIBER OPTICAL LAMPS

BACKGROUND OF THE INVENTION

The present invention relates to a brightness control device for use in lamps of the type in which light is emitted by means of a fiber optical conductor, i.e., the so-called fiber optical lamps.

It is known in the art that the brightness of the light emitted by fiber optical lamps may be controlled by inserting a variable resistance or a regulating transformer into the circuit of the lamp, or by utilizing phase-shifting controls for this purpose. With each of these arrangements, the operating voltage of the lamp and thus the color temperature of the light emitted is altered, although the emission characteristics of the fiber optical conductor or conductors, respectively, are preserved, i.e., the angle of radiation and the magnitude of the illuminated area are maintained constant.

It is also known to effect the regulation of brightness by means of a built-in iris diaphragm. With this arrangement, the color temperature of the lamp remains constant, but the angle of radiation of the optical fiber conductor is changed.

SUMMARY OF THE INVENTION

Accordingly, it is an object of the present invention to provide a brightness control device for fiber optical lamps which in the course of its operation avoids the aforementioned disadvantages of the prior art.

It is a specific object of the present invention to provide a brightness control device for fiber optical lamps which effects a reduction in brightness without altering the color temperature of the lamp and the emission characteristics of the fiber optical conductor.

In accordance with the present invention, these and other objects are attained through the provision of a brightness control device which comprises a variable size diaphragm arranged unilaterally in the light beam between the lamp light source and the light entrance area of the fiber optical conductor, the shape of the diaphragm being such that the cross-section of the optical fiber bundle is reduced asymmetrically and from one side only. The present invention thus provides a brightness control device wherein the color temperature and the emission characteristics of the lamp are maintained constant by obviating the necessity for interference with the power supply of the lamp, and by asymmetrically and unilaterally reducing the light flux impinging on the entrance area of the optical conductor. While the instant brightness control device asymmetrically reduces the angle of light received on the entrance area of the optical conductor, due to the multiple reflection of the light beams within the optical fiber bundle, the emission characteristics of the optical fiber conductor remain unaffected.

In the preferred embodiment of the instant invention, the diaphragm is designed in the shape of a sector of a circle, the apex of the circular sector being located approximately on the optical axis of the path of the illuminating beam.

In a particularly preferred embodiment of the present invention, the diaphragm preferably comprises a plurality of circular, rotatingly engaged, diaphragm rings, each of the rings having a circular sector-shaped portion which extends from the ring into the free area enclosed thereby, with the apex of each circular sector being located approximately on the optical axis of the illuminating beam, the several circular sectors being congruent with respect to one another. With this construction, the rings may be rotatingly displaced in relation to each other from a position in which all of the circular sectors are superposed to form a single packet of a relatively small area, to a position in which they are located more or less adjacently to each other, thus covering a correspondingly larger area.

In order to achieve this rotational displacement of each sector in a simple manner, in a further embodiment of the instant invention, the foremost ring is equipped with a handle whereby the ring may be rotated manually, and the remaining rings are connected to the foremost ring via a pin-and-slot arrangement, in which driving tongues engage elongated slots in the rings whereby the sectors are displaced in a fan-like manner, rotation of the foremost ring serving to engage and then rotate the remaining rings in consecutive fashion. The driving tongues may comprise pins, or alternatively may be formed by bending the material punched from each slot at the base thereof.

Other objects, features, and advantages of the instant invention will become apparent to the skilled artisan upon examination of the following detailed description of the instant invention, taken in conjunction with the figures of drawing, wherein:

BRIEF DESCRIPTION OF THE DRAWINGS

FIG. 1 is a vertical sectional view of a fiber optical lamp utilizing the brightness control device of the present invention in a first embodiment;

FIG. 2 is a frontal sectional view along line II—II of FIG. 1;

FIG. 3 illustrates an alternative embodiment of a fiber optical lamp employing the brightness control device of the present invention; and, FIG. 4 is a perspective view of the brightness control device according to the instant invention.

DETAILED DESCRIPTION OF THE PREFERRED EMBODIMENTS

Referring to the drawings, FIG. 1 illustrates a conventional fiber optical lamp having a housing 1 and containing therein a lamp 2, the beam of which is conducted in part directly and in part by reflection from concave mirror 3, to a first lens 4. A second lens 5 reproduces the light source at the entrance area 6a of a fiber optical conductor 6, which conducts the light over a suitable distance and emits the light through opening 6b.

In the fiber optical conductor, the individual fibers are arranged so that each fiber is contacted with light having an angle of incidence of $\alpha_o - \alpha_x$. To attain light attenuation, therefore, the beam of light must be dimmed uniformly, percentage-wise, over the entire range of the angle of incidence. Statistical distribution of the individual fibers in the fiber optical conductor is not necessary. The direction of incidence of the beam is also immaterial, because of the multitude of total reflections in the individual fibers.

In the embodiment of the drawings, a variable arc-length, sectorial diaphragm is arranged between the lenses 4 and 5, comprising the three diaphragm rings 7, 8, 9. As seen in FIGS. 2 and 4, each diaphragm ring is formed with a sector 7a, 8a, 9a, respectively, which extends into the free area bounded thereby. The diaphragm rings 7, 8, and 9 are superposed upon each other and may be rotated in relation to each other in an infinitely variable manner between two terminal positions. In one of the terminal positions, the sectors 7a, 8a, 9a are superposed upon each other so that only the cross-sectional area of one sector acts effectively as the diaphragm in the path of the beam. In the other terminal position the sectors are located adjacent to each other and overlap only slightly. This position is illustrated in FIGS. 2 and 4 wherein it may be seen that one half of the path of the light beam is blocked.

While the brightness control device of the instant invention has been described with reference to a three ring diaphragm, each ring having its own sector, it is contemplated by the instant invention that any number of such rings having circular sector portions of any suitable arc length, such as would be obvious to those skilled in the art, may be employed without departing from the spirit thereof.

Upon rotation of the rings of the diaphragm relatively to each other, the sectors are displaced in a jalousy-like fashion, wherein the leading ring engages the ring following it in rotation. This mode of displacement is obtained by means of a pin and slot arrangement on the rings, as can be best seen in FIG. 4.

FIG. 4 shows the rings of the diaphragm in the same terminal position as shown in FIG. 2. The leading ring 7 is equipped with a pin 7b. The ring 8, next in line, is provided with an elongated slot 8b, which is engaged by the pin 7b of the preceding ring 7. The ring 8 in addition is equipped with a tongue 8c, bent out from the elongated slot 8b, which engages in turn the elongated slot 9b of the next succeeding ring. The ring 9 is mounted in a stationary manner.

A handle 10 is mounted on the leading ring 7 in order to manually rotate this ring. When the diaphragm ring 7 is rotated manually by the handle in the direction of the arrow A in FIG. 4, the pin 7b thereof slides initially into the elongated slot 8b of the succeeding ring 8, whereby the sectors 7a and 8a become increasingly superposed upon each other. When the pin 7b engages the end of the elongated slot 8b, the ring 8 is also entrained, until all three sectors 7a, 8a, and 9a are superposed upon one another. The pin 8c and the elongated slot 9b serve to limit the degree of rotation. When the ring 7 of the diaphragm is rotated in the opposite direction, the sectors 7a, 8a, 9a are pulled apart.

In the closed position of the diaphragm, the sectors 7a, 8a, and 9a are superposed upon each other, forming thereby a relatively small area, the magnitude of which is a function of the number of the diaphragm disks and the size of the sectors in the path of the light beam. In order to eliminate even this slight loss of light attendant to the presence of the diaphragm in the light path, which is hardly noticeable in actual practice, the complete diaphragm may be constructed so that it may be swung out of the path of the light beam in a lateral direction.

FIG. 3 illustrates another typical embodiment of a fiber optical lamp, utilizing the brightness control device of the present invention. In this embodiment, an eliptical reflector lamp 11 is used as the source of light. The sectorial diaphragm is located between the lamp and the light entrance area of the fiber optical conductor, and functions identically as has been described in detail above.

While the invention has now been described in terms of certain preferred embodiments, and exemplified with respect thereto, the skilled artisan will readily appreciate that various modifications, changes, omissions and substitutions may be made without departing from the spirit thereof. It is intended, therefore, that the present invention be limited solely by the scope of the following claims.

What is claimed is:

1. A brightness control device for use with fiber optical lamps which include an optical fiber bundle having a light entrance area and a light source which directs a light beam towards said light entrance area, comprising a diaphragm arranged unilaterally in the light beam between said light source and said light entrance area, said diaphragm having a variable size and a shape such that the cross-section of the light entrance area of said fiber bundle is asymmetrically and unilaterally reduced.

2. The brightness control device of claim 1, wherein said diaphragm comprises a circular sector of variable arc length having its apex located on the optical axis of said light beam.

3. The brightness control device of claim 2, wherein said diaphragm comprises a plurality of circular, rotatingly engaged diaphragm rings, each of which has a circular sector-shaped portion which projects into the free area enclosed by said ring with the apex of said sector located approximately on the optical axis of said light beam, said sectors being superposable with respect to one another.

4. The brightness control device of claim 3, wherein said diaphragm rings are rotatingly engaged by means of a pin and slot arrangement mounted on the circumference of said rings such that rotation of a first of said diaphragm rings engages and then rotates the remainder of said rings in consecutive fashion.

5. The brightness control device of claim 4, wherein the pins of said pin and slot arrangement comprise short tongues formed by bending the material punched out from the slots at the base thereof.

* * * * *